(No Model.) 5 Sheets—Sheet 1.
H. KRUKENBERG.
MOVEMENT CURE APPARATUS.

No. 534,801. Patented Feb. 26, 1895.

(No Model.) 5 Sheets—Sheet 2.
H. KRUKENBERG.
MOVEMENT CURE APPARATUS.
No. 534,801. Patented Feb. 26, 1895.
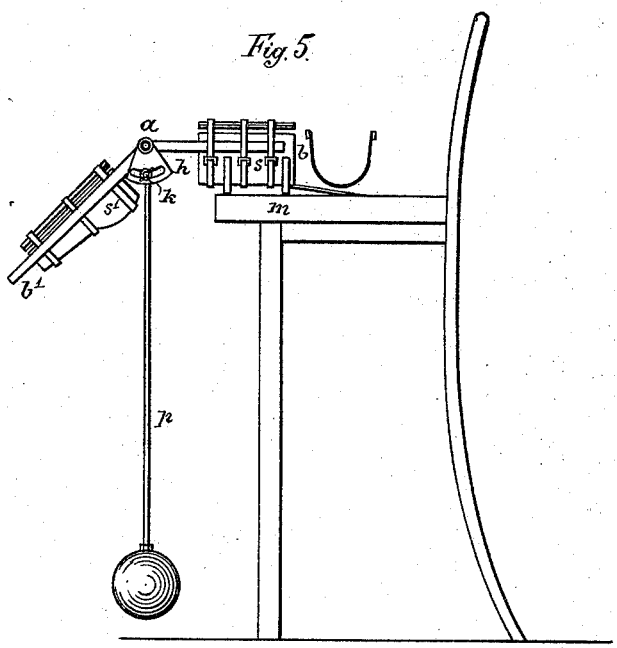
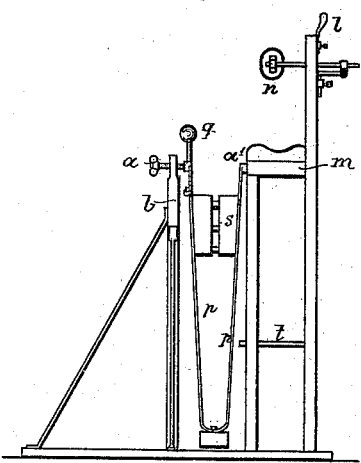
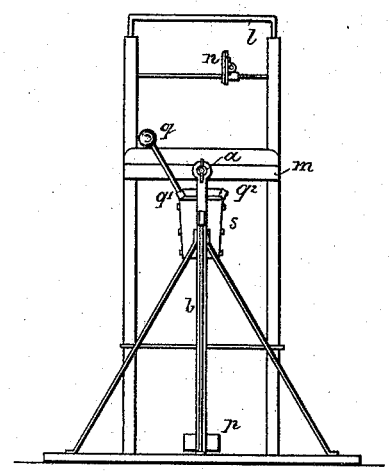
Witnesses:
Inventor:
Hermann Krukenberg,
by A. Faber du Faur,
Attorney.

(No Model.) 5 Sheets—Sheet 3.
H. KRUKENBERG.
MOVEMENT CURE APPARATUS.
No. 534,801. Patented Feb. 26, 1895.
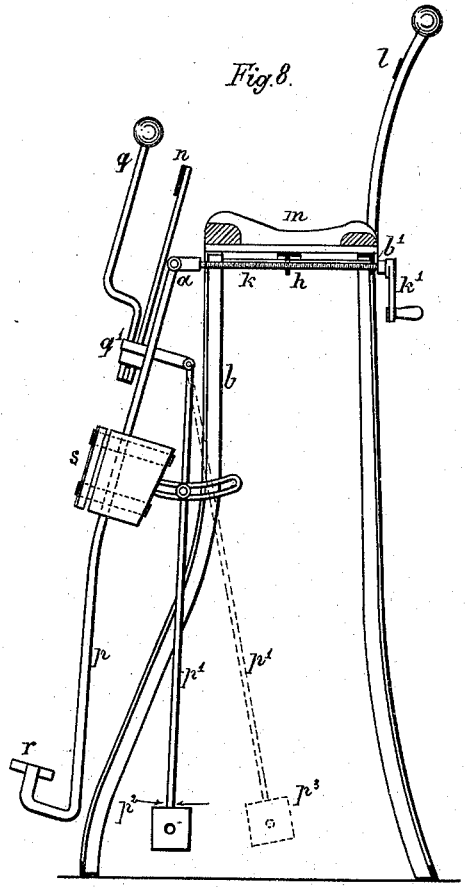
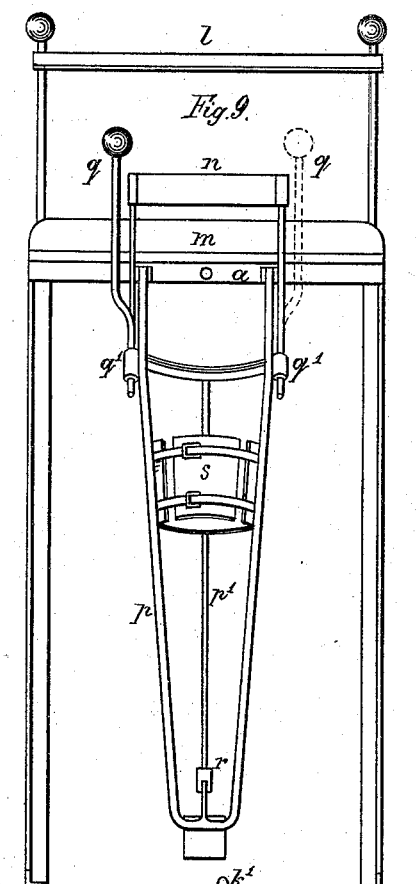
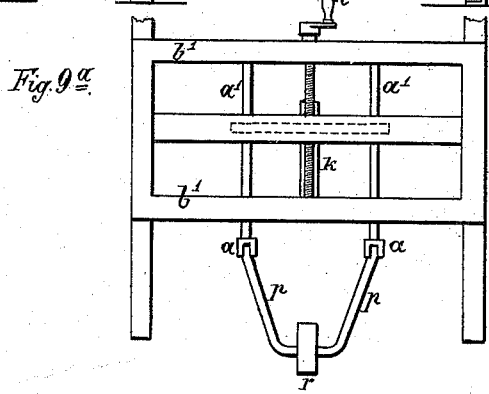
Witnesses
Inventor:
Hermann Krukenberg,
by A. Faber du Faur,
Attorney (No Model.) 5 Sheets—Sheet 4.

H. KRUKENBERG.
MOVEMENT CURE APPARATUS.

No. 534,801. Patented Feb. 26, 1895.

Witnesses:
Klas H. Ternstedt
J. J. Malle.

Inventor:
Hermann Krukenberg,
by A. Faber du Faur.
Attorney.

(No Model.) 5 Sheets—Sheet 5.

H. KRUKENBERG.
MOVEMENT CURE APPARATUS.

No. 534,801. Patented Feb. 26, 1895.

Witnesses:
Klas H. Pernstedt
J. J. Walle

Inventor:
Hermann Krukenberg,
by Kabir du Fauss
Attorney.

UNITED STATES PATENT OFFICE.

HERMANN KRUKENBERG, OF HALLE, GERMANY.

MOVEMENT-CURE APPARATUS.

SPECIFICATION forming part of Letters Patent No. 534,801, dated February 26, 1895.

Application filed June 7, 1893. Serial No. 476,884. (No model.)

*To all whom it may concern:*

Be it known that I, HERMANN KRUKENBERG, physician, a subject of the King of Prussia, residing at Halle, in the Kingdom of Prussia, Germany, have invented new and useful Improvements in Apparatus for Moving Limbs, of which the following is a specification.

My invention has reference to apparatus for the cure of stiff limbs and deformities, and it consists essentially in means for assisting the motions of the diseased joint, voluntary with the patient, by the inertia of a pendulum having its point of suspension carried by a firm support, combined with means for actuating the pendulum.

The nature of my invention will best be understood when described in connection with the accompanying drawings, in which—

Figure 1:
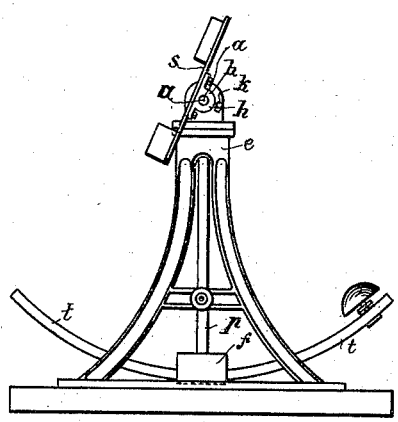
Figure 2:
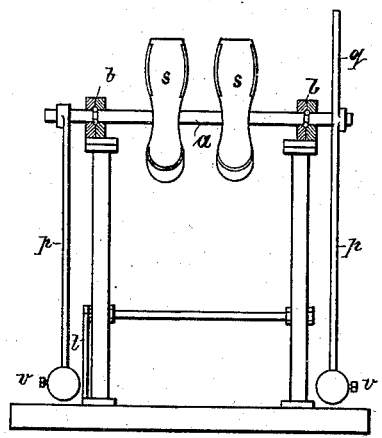
Figure 3:
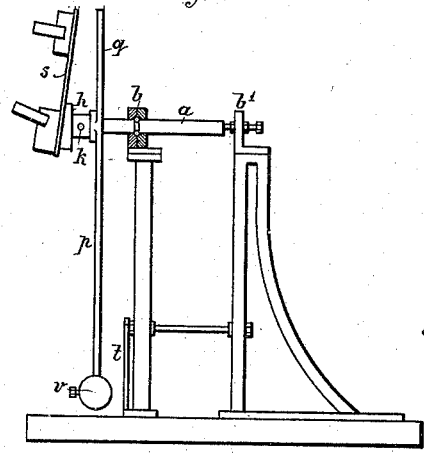
Figure 4:
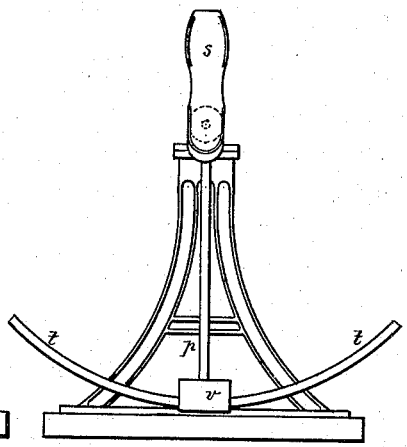
Figure 10:
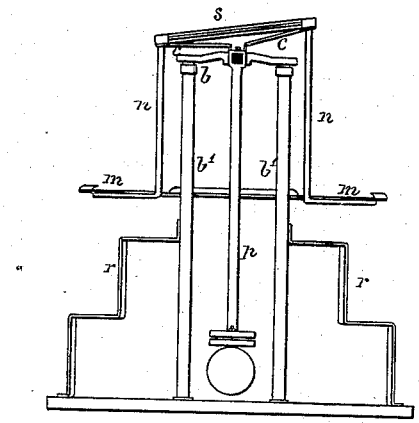
Figure 11:
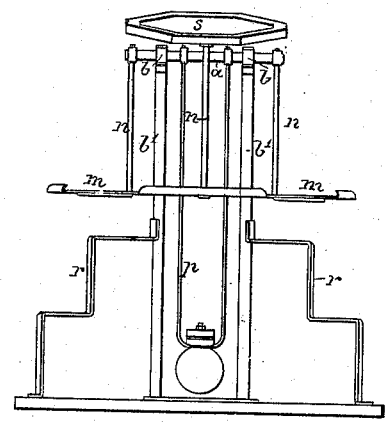
Figure 12:
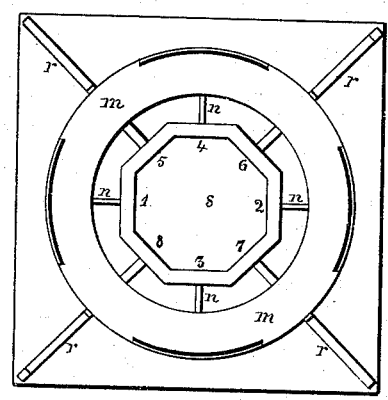
Figure 13:
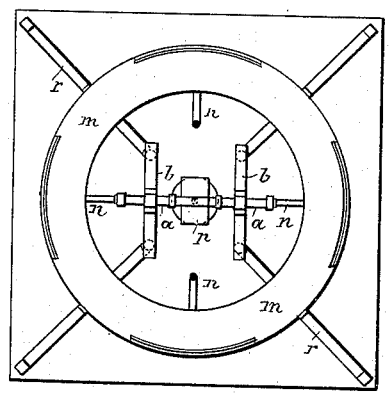
Figure 14:
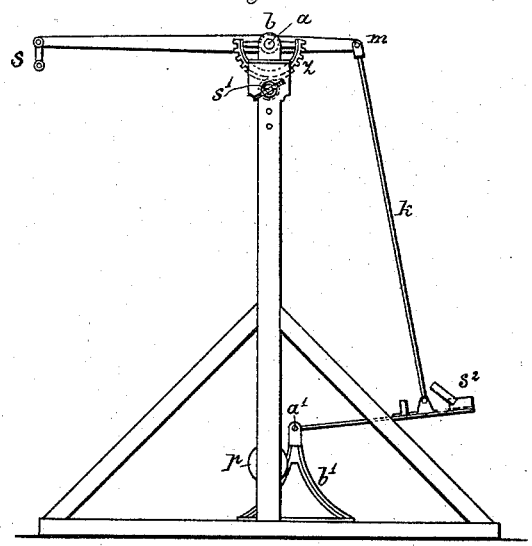
Figure 15:
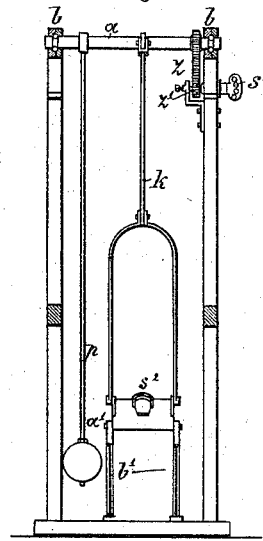
Figure 16:
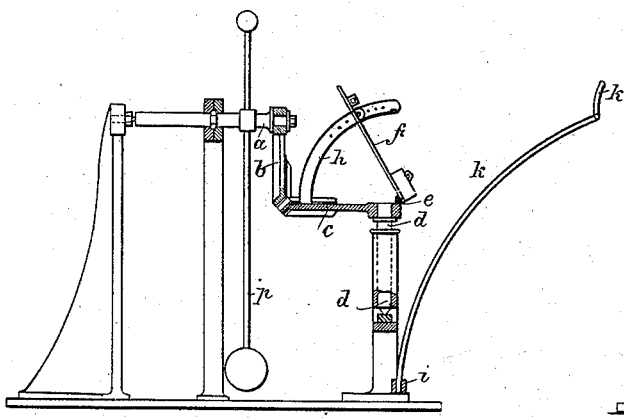
Figure 17:
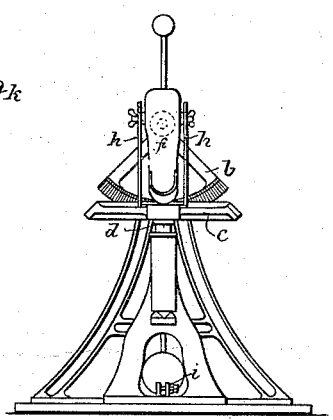

Figure 1 represents a side elevation of an apparatus constructed according to my invention. Fig. 2 is a sectional front elevation of the same. Fig. 3 is a sectional side elevation of an apparatus adapted to roll the leg. Fig. 4 is a front elevation of the same. Fig. 5 is a side elevation of an apparatus for bending or stretching the knee-joint. Figs. 6 and 7 are side and front elevations respectively of an apparatus for stretching the hip-joint. Fig. 8 is a sectional side elevation of an apparatus for spreading the hip joint. Fig. 9 is a front view thereof, and Fig. 9ª a plan view. Figs. 10 and 11 are side and front elevations, respectively, of an apparatus for treating curvatures of the vertebra. Figs. 12 and 13 are plan views of the same. Figs. 14 and 15 are side and front elevations of an apparatus for simultaneously treating two or more joints. Fig. 16 is a sectional side elevation of an apparatus for treating club and flat feet. Fig. 17 is a front elevation, and Fig. 18 a plan of part thereof.

Similar letters of reference designate corresponding parts.

Referring at present to Figs. 1 and 2 of the drawings, where I have illustrated an apparatus for bending or stretching the ankle, the letter $a$ designates a horizontal shaft mounted in bearings $b$ $b$ formed at the tops of two vertical standards. To the shaft are secured two foot-rests $s$ $s$, adjustable with reference to the position of the foot of the invalid, by means of screws $k$ and lugs $h$. Two pendulums $p$ $p$ are rigidly secured to the opposite ends of the shaft; one of the same being preferably provided with an upwardly extending handle $q$.

In applying the apparatus, the invalid is placed upon a chair (not shown) corresponding nearly in height to the shaft $a$ and is strapped to the same, near the knees, in the usual manner. The feet are placed into the foot-rests $s$ if necessary. The deformed or diseased parts are consequently firmly supported. The voluntary or natural movements of the ankle are assisted and augmented by the motion of the pendulums, which latter may be set and kept into motion, either by means of the handle $q$ by the invalid himself, or by the attendant, or solely by the voluntary movements of the diseased limb. Of course, the treatment is similarly applicable to one foot, and in this case the sound foot may be used to start and maintain the oscillations of the pendulum.

The pendulum bobs, or weights, which are quite heavy, are preferably made adjustable and removable, for instance, by means of the set screws $v$, in order that the length of the pendulum may be varied, or bobs of different weights substituted.

A bell adjustably mounted on the smooth segment $t$ may be provided to indicate the amplitude of the vibrations.

I will now proceed to describe different forms of apparatus adapted for the treatment of different parts of the body, all of which however embody the general principle involved in the apparatus just described.

Referring to Figs. 3 and 4 where an apparatus for rolling the leg is illustrated, the shaft $a$ is mounted in bearings $b$ as before, but is made adjustable in the direction of its length by a set screw $b'$. Only one pendulum $p$ is made use of. The foot-rest $s$ is adjustably secured to the forward end of the shaft by means of a hub $h$ and screw $k$, so that its angular position may be changed to suit circumstances. The invalid is seated in the manner hereinbefore described in connection with Figs. 1 and 2 and the pendulum caused to vibrate. The amplitude may, as before, be determined by a bell.

In Fig. 5 I have shown an apparatus adapted for bending or stretching the knee-joint forward and backward. Referring to this figure, $m$ is a chair to which is secured a clamp or bandage $s$ of a usual construction. From the clamp extend two steel rails, to which are hinged at $a$ a second pair of rails $b'$ supporting a clamp or bandage $s'$. The hinge $a$ carries two sectors $h$, to which the pendulum $p$ is secured by a slot and screw connection $k$.

In using the apparatus the upper part of the thigh is strapped in the clamp $s$. The inclination of the clamp $s'$ is adjusted, if found necessary, by means of screw $k$, and the leg secured in the bandage $s'$. It will be noted that both the leg and the point of suspension of the pendulum are firmly supported without impeding motion at the knee. If desired the pendulum may be slowly raised and lowered so that resisting motions are made by the knee stretchers.

The apparatus shown in Fig. 5 may also be used for treating stiffness at the elbows. In this case the patient sits upon a chair of suitable height at the side of the chair $m$ and puts the upper part of the arm into the stationary clamp $s$ and the lower part into the movable one. Motion is then imparted by the pendulum to the diseased joint.

Figs. 6 and 7 illustrate an apparatus for stretching the hip joint. The pendulum $p$ is in this instance made of spring metal bent substantially U shape and carrying the weight at the bight. It is suspended on one side by a screw $a'$ entering the chair $m$ and on the other side by a set-screw $a$ entering the standard. At a suitable height is connected the bandage like clamp $s$ adapted to encompass the upper part of the thigh which is secured to the same by straps, as usual. The distance between the two members of the pendulum rod can be adjusted by the screw $a$ to correspond to the thigh. To enable the patient, or attendant, to regulate the motion of the pendulum by hand a handle $q$ is provided which can be introduced into either of the sockets $q'$ or $q^2$. The chair is provided with a seat similar to a lady's saddle so that the patient can sit facing either to the right or to the left according to the leg to be subjected to the treatment. The sound leg resting upon the seat is strongly bent to prevent curvature of the lower vertebral joints of the spine. To the same end a cushion $n$ adjustable in three directions is secured to the back of the chair and an elbow rest $l$ vertically adjustable is provided.

To spread the hip joint (abduction), I make use of the apparatus shown in Figs. 8, 9 and $9^a$. Referring to these figures, $p$ designates a rod forming a member of the pendulum $p$ $p'$ and provided at its lower end with a foot rest $r$. The point of suspension $a$ of the pendulum $p$ $p'$ is carried by two longitudinally movable rods $a'$ guided beneath the seat $m$ of the chair in two cross bars $b'$. The upper portion of member $p$ of the pendulum projects forward, while the lower portion is bent backward. The member $p'$ is radially adjustable with respect to member $p$, and is so set with respect to the latter that when member $p'$ is in the position shown in dotted lines in Fig. 8, the leg fastened to member $p$ by the bandage $s$, is already drawn considerably backward, while when $p'$ is in its original position as shown in full lines, the leg is already bent to about the middle position. The involuntary lateral movement of the whole pelvis and the upper part of the body is prevented by the seat placing the sound leg into a bent position and causing an elevation of the half of the pelvis situated on the sound side, also by the back $l$ of the chair, and finally by a tension device applied, if required, at $r$ to the end of rod $p$ and embracing the ankle, which will prevent the patient from raising the pelvis half of the sick side.

A handle $q$ adapted to fit into sockets $q'$ $q'$ may be used for the same purpose described in connection with Figs. 6 and 7. In this instance it also compels the patient to keep the upper part of the body toward the sick side. A particular feature of the present apparatus is that the point of suspension $a$ of the pendulum is lower than the turning point of the hip.

$n$ is a heavy band of india-rubber stretched across two posts secured in sockets in the pendulum and participating in the movement of the latter. This band bears upon the hip bone with increasing pressure as the pendulum bar swings outwardly and thereby holds the hip bone firmly in its socket. To regulate the pressure uniformly for different thicknesses of legs and also to adjust the pendulum member $p$ to different distances with reference to the seat, I make use of a screw $k$ engaging a nut secured in a transverse bar $h$ secured to the rods $a'$ $a'$. By turning the crank $k'$ arranged behind the chair, the bar $h$ and the sliding rods $a'$ together with the point of suspension $a$ can be moved forward or backward.

The apparatus for the treatment of curvatures of the vertebra is illustrated in Figs. 10 to 13. The horizontal shaft $a$, made square in cross-section with round journals, is supported in boxes $b$ on posts $b'$. The hollow seat $s$ is carried by two studs $c$ secured to the seat. From the shaft $a$ is suspended by a pair of rods $n$ an annular rest or platform $m$ for the feet, which platform in turn is connected to the seat $s$ by another similar pair of rods. The pendulum $p$ is firmly secured to the shaft $a$. The seat $s$ has a slight inclination, and the direction in which the patient has to occupy the same, depends upon the nature and direction of the curvature, since he is obliged to sustain himself *in equilibrio*, to counterbalance the oscillations of the apparatus, by movements of the upper part of the body.

In treating a curved back (kyphosis) the patient must face in the direction 1, Fig. 12. When facing in the opposite direction, the upper part of the body must be brought forward for maintaining his balance and the muscles of the belly and flexors of the upper part of the thigh are brought into activity. In lateral curvatures of the back the patient sits in the directions 3 and 4. The directions 5, 6, 7 and 8 compel the patient to turn and to bend simultaneously, or to raise the upper part of the body. The braces $r\ r$ serve to brace the posts $b'$ and as means to reach the seat $s$.

In Figs. 14 and 15 I have shown an apparatus for simultaneously stretching the shoulder and elbow joints; for rolling the shoulder and elbow-joints and for simultaneously bending the knee and hip-joints. The shaft $a$ supported at $b$ carries in addition to the pendulum $p$ a lever $s, m$. The handle $s$ of the latter serves for the stretching motions of the arm which become efficacious at the shoulder and elbow, but it may also be employed for assisting and corroborating the proper activity of the patient using other parts of the apparatus. The handle $s'$ transmits rolling movements of the hand by means of a small spur-gearing $z\ z'$ to the shaft $a$, and, in reverse direction, returns the effects of the pendulum to the hand. By giving the toothed wheel $z$ a greater circumference than the wheel $z'$ movements of the pendulum are multiplied in the handle, and therefore a proportionally small stroke of the pendulum, turns of eighty degrees may be produced in the arm. At the same time the spur gearing reduces the movement of the handle, with the effect that the pendulum $p$ can be put in oscillation by the exertion of a small force. When the arm is stretched out, both the shoulder and elbow are turned, but when it is bent only the elbow joint is affected. The foot-rest $s^2$ takes up the bending and stretching movements of the leg and transmits the same by the link $k$ to the lever $s\ m$ and to the shaft $a$, while the effects of the pendulum $p$ pass from $a$ to $s^2$. A plate, the axis of revolution $a'$ of which is carried by the standard $b'$, serves to firmly support the foot on the rest $s^2$. The movements of the patient acting on another part of the apparatus, may also be assisted by a second person moving the rest $s^2$.

Figure 18:
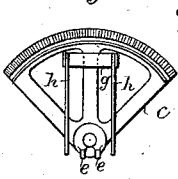

The apparatus illustrated in Figs. 16, 17 and 18 has for its object to cure club or flat feet by restoring a normal position or mobility of the foot by mechanically influencing the abnormally developed joints. I attain this object by holding the foot in a determined position and subjecting the firmly supported foot to compulsory movements acting on the same in rolling round the longitudinal axis of the foot, and round the longitudinal axis of the lower part of the thigh at the same time turning simultaneously the tip of the foot inward and outward and raising the inner or outer edge of the foot.

Referring to the drawings $a$ is the horizontal shaft supported by a center and ball bearings, which imparts motion to a vertical shaft $d$ by means of toothed segments $b$ and $c$. The vertical shaft $d$ carries upon the hub of its segment $a$ hinge $e$, and, swiveled to the latter is a foot-rest $f$, provided with straps or the like for securing the foot. The rest $f$ may be adjusted in an inclined direction as required. To effect this adjustment the segment $c$ has secured to its spokes a plate $g$ (see Fig. 18) provided with two curved pieces $h$ between which slides the foot tip plate furnished for this purpose with lateral ears, so that the latter, and in consequence also the foot rest, may be adjusted at any suitable height between the pieces $h$ by means of thumb nuts or the like. At the lower end of the front standard a socket $i$ is arranged which is provided with a set screw for the leg holder consisting of a curved rod $k$ having a support for the leg. The holder of the foot rest is adjusted in such a manner that the leg, with respect to the support, is fastened at an angle which is deducted from the formation of the foot for rendering the effect of the forced movements of the foot joint the most advantageous. In the case of a club-foot the leg support is adjusted in such a manner that in the position of rest, the tip of the foot is forced outward and the outer edge of the foot is raised. If a flat foot is to be treated the inverse position is given to the leg support. The pendulum $p$ having a heavy, adjustable weight and handle furnishes the required movement.

What I claim as new is—

1. A movement cure apparatus comprising in its structure a frame, a pendulum suspended thereon and free to oscillate, a movable rest for the diseased member, and a positive connection of said rest with the pendulum, for obtaining concurrent action in both directions whereby the voluntary movements of the patient are assisted by the inertia of the said pendulum, substantially as described.

2. A movement cure apparatus comprising in its structure a frame, a pendulum suspended thereon and free to oscillate, and a rest for the diseased member mounted on the pendulum shaft, whereby the voluntary movements of the patient are assisted by the inertia of the pendulum, substantially as described.

3. A movement cure apparatus comprising in its structure a frame, a pendulum suspended thereon and free to oscillate, a rest for the diseased member, a positive connection of said rest with the pendulum, for obtaining concurrent action in both directions whereby the voluntary movements of the patient are assisted by the inertia of the pendulum, and a support for the diseased member, substantially as described.

In testimony whereof I have signed my name to this specification in the presence of two subscribing witnesses.

HERMANN KRUKENBERG.

Witnesses:
 OTTO HERING,
 GUSTAV HÜLSMANN.